March 6, 1934.   S. DYKTOR ET AL   1,949,994
STOP LIGHT SWITCH
Filed March 6, 1929   2 Sheets-Sheet 1
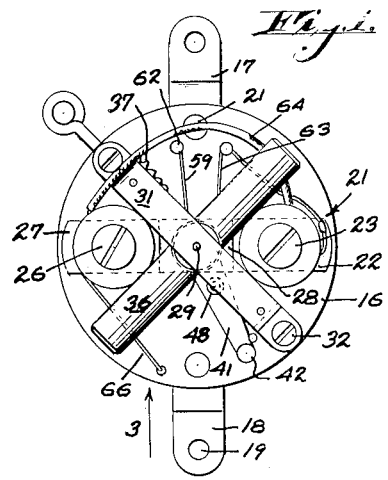
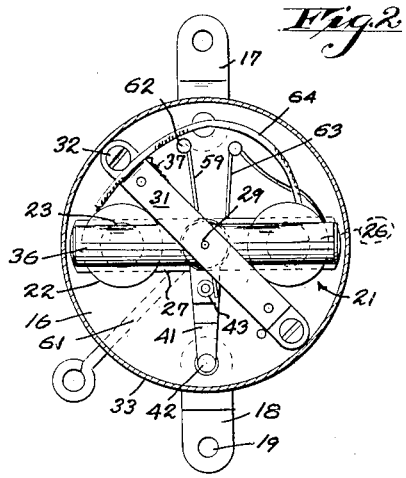
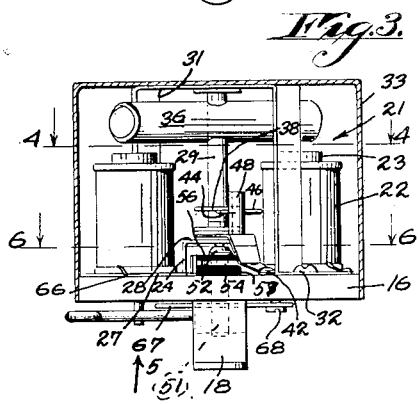
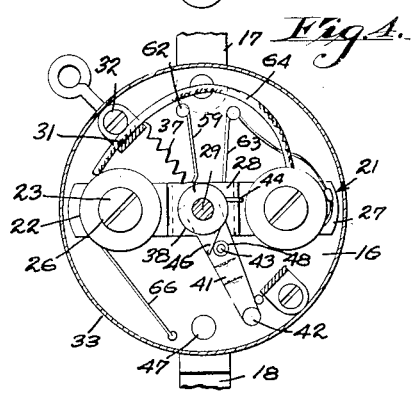
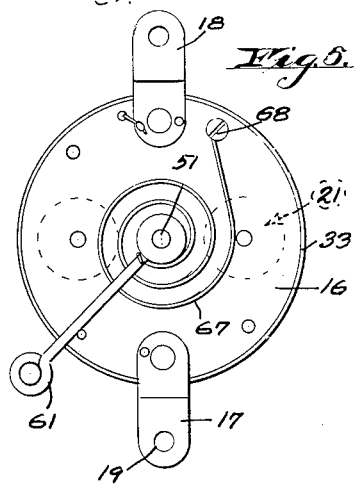
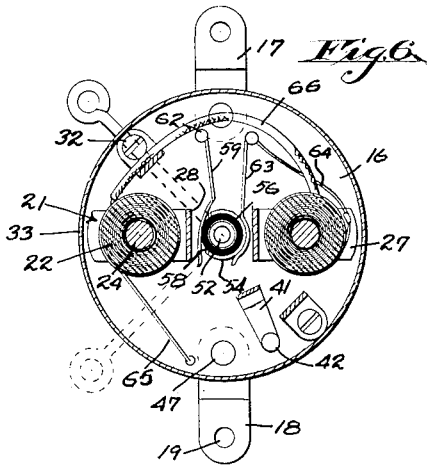
Inventor
Stanislas Dyktor
H. G. Dyktor
by Hazard and Miller
Attorneys March 6, 1934.　　S. DYKTOR ET AL　　1,949,994
STOP LIGHT SWITCH
Filed March 6, 1929　　2 Sheets-Sheet 2
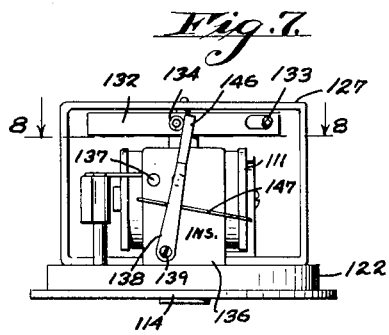
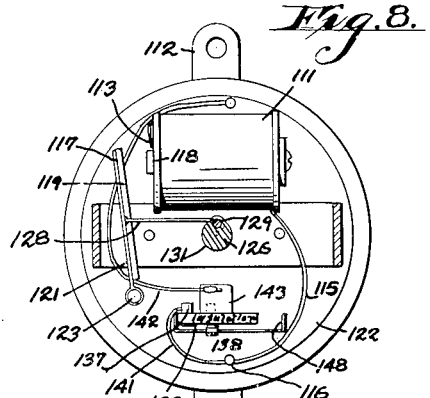
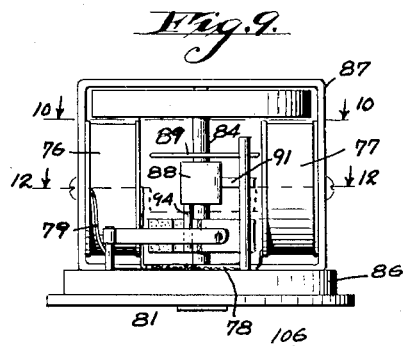
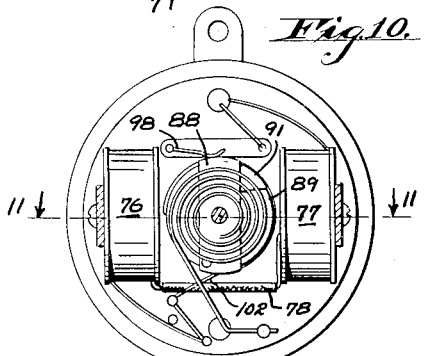
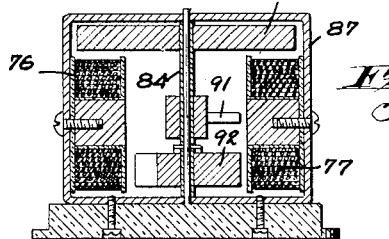
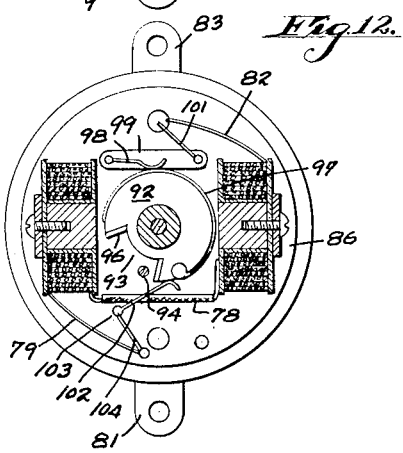
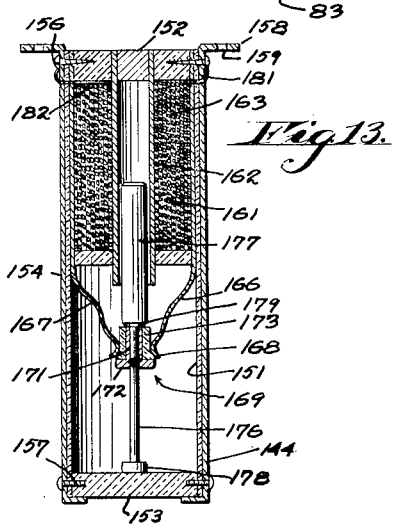
Inventor
Stanislas Dyktor
by H. G. Dyktor.
by Hazard and Miller
Attorneys Patented Mar. 6, 1934

1,949,994

UNITED STATES PATENT OFFICE 1,949,994

STOP LIGHT SWITCH

Stanislas Dyktor and Herbert G. Dyktor,
Los Angeles, Calif.

Application March 6, 1929, Serial No. 344,787

5 Claims. (Cl. 200—90)

This invention relates to electrical switches, and more especially to a switch for automatically effecting a periodic current fluctuation.

An object of the invention is the provision of a compact, inexpensive switch capable of efficiently operating in connection with an electric circuit, to produce a periodic current fluctuation therein.

While the switch, with slight modifications in respect to dimensions, is adapted for practically universal application, i. e., to circuits of practically any voltage and amperage, it has been designed with the particular object in view of adapting it to the circuit by which the stop light of a vehicle is energized. Consequently, another object of the invention, is the provision of a switch of the general character described, the movable parts of which are so designed and balanced that they are not subject to disturbance by vibration of the structure upon which they are mounted.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a top plan view of the switch in one of its embodiments, with the cover removed and with the contacts thereof in circuit-opening position.

Fig. 2 is a view similar to Fig. 1, with the contacts moved to circuit-closing position.

Fig. 3 is a view showing the cover for the switch, in vertical, medial section, and the remainder of the switch in side elevation, the direction of view being indicated by the arrow 3 of Fig. 1.

Fig. 4 is a horizontal sectional view taken upon the line 4—4 of Fig. 3, with the direction of view as indicated.

Fig. 5 is an underneath plan view, the direction of view being indicated by the arrow 5 of Fig. 3.

Fig. 6 is a horizontal sectional view taken upon the line 6—6 of Fig. 3, with the direction of view as indicated.

Fig. 7 is a side elevation of a slightly modified form of the switch with the cover therefor, removed. The direction of view is indicated by the arrow 7 of Fig. 8.

Fig. 8 is a horizontal sectional view taken upon the line 8—8 of Fig. 7, with the direction of view as indicated.

Fig. 9 is a side elevation of another modified form, with the cover removed, the direction of view being indicated by the arrow 9 of Fig. 10.

Fig. 10 is a horizontal sectional view taken upon the line 10—10 of Fig. 9, with the direction of view as indicated.

Fig. 11 is a vertical, medial sectional view taken upon the line 11—11 of Fig. 10, with the direction of view as indicated.

Fig. 12 is a compound, horizontal sectional view taken upon the lines 12—12 of Fig. 9, with the direction of view as indicated.

Fig. 13 is a vertical, medial sectional view of a still further modified form.

In terms of broad inclusion, the switch of the present invention, comprises a pair of optionally electrically connectible or disconnectible switch contacts, and an electromagnetic device, connected in parallel with each other and adapted to be connected in series with a current-consuming device such as a warning light, the armature of said electro-magnetic device, being so associated with the contacts, that upon energization of the electromagnet, the contacts are electrically connected, whereupon the major portion of the current will pass through the contacts to the current-consuming device, lowering the amperage passing through the electromagnetic device, permitting the core thereof to effect electrical disconnection of the contacts, with the result that the current-consuming device is de-energized, and the full amperage of the circuit again passed through the electromagnetic device. As a result, the switch is capable of effecting a periodic current fluctuation in the circuit in which it is interposed.

Specifically describing the invention in the embodiment thereof shown on Figs. 1 to 6 inclusive, it comprises a base 16 preferably composed of insulating material such as sheet fibre, and also preferably being in the form of a disc, it being understood however, that the precise shape of the base is immaterial. A pair of legs 17 and 18 are rigidly attached to the under surface of the base 16, and each is provided with an aperture 19 through which any fastening means such as a screw, may be passed to rigidly attach the switch to any suitable structure such as the under side of the floor board of an automobile. Preferably the legs 17 and 18 are composed of metal, so that they serve not only as means for mounting the switch, but as binding posts therefor, also, to facilitate interposing of the switch within an electrical circuit such as that by which the warning stop light of the vehicle, is energized.

An electromagnet 21 is secured to the upper side of the base 16, this magnet being the well known type of horseshoe electromagnet having a coil 22 upon each arm 23 of a core 24. This core is conveniently formed by utilizing a headed screw 26 to serve as each of the arms 23 of the core, and a strip 27 of soft iron, as that portion of the core connecting the arms, the screws 26 being threaded into the ends of the strip 27, to rigidly secure the coils 22 in position.

The center portion 28 of the strip 27 between the coils 22, is raised, and journalled therein is a shaft 29. The upper end of the shaft 29, is journalled in a bracket 31 of inverted U-shaped configuration. This bracket 31 is secured to the base by screws 32 or their equivalent, and serves as a support for the cover 33 of the entire switch. The shaft 29 carries a bar armature 36 rigid therewith, the polarity of which is such that when the coils 22 of the electromagnet are energized, the bar will be attracted thereby, so that it closely overlies the poles of the electromagnet, as shown upon Fig. 2. A coil spring 37 is under tension between a portion of the bracket 31 and a disc 38 rigid with the shaft 29, the connection of the spring 37, to the disc 38, being eccentric in respect to the shaft, so that the spring urges the shaft in rotary movement to withdraw the armature 36 from proximity to the poles of the electromagnet, to the position indicated upon Fig. 1.

A movable switch arm 41 is mounted for free rotary movement upon the lower end of the shaft 29 above the raised portion 28 of the strip 27. This switch arm is preferably of resilient material such as spring brass, and carries a movable contact 42 upon its outer end which is pressed downwards due to the natural resilience of the material of which the switch arm 41 is composed, upon the top of the base 16. The switch arm 41 also carries a pin 43 which is rigid therewith and which is adapted to be engaged by each of a pair of spaced fingers 44 and 46 which are rigid with the disc 38. The finger 44 is so positioned with respect to the armature 36, that when the armature moves toward the position indicated upon Fig. 2, this finger engages the pin 43 and swings the switch arm 41 to bring the contact 42 into engagement with a fixed contact 47 which is electrically connected to the leg 18. The finger 46 is disposed upon the opposite side of the pin 43, and so positioned in respect to the armature 36, that as the armature swings toward the position shown on Fig. 1, the contact 42 is moved out of engagement with the contact 47. Preferably a short piece of rubber tubing 48 is slipped over the pin 43.

A shaft 51 is journalled in the base 16, in axial alignment with the shaft 29; and a head 52 on the shaft 51, is disposed under the raised portion 28 of the strip 27 and in proximity thereto, so that the head 52 is in electrical contact with a projection 53 of the shaft 29 which extends through the strip 27. A disc 54 of conducting material is received between two discs 56 and 57 of insulative material. The conductor disc 54 is of greater diameter than the insulation discs 56 and 57; but the conductor disc is flattened on one side 58, as best shown upon Fig. 6, so that when turned to the position indicated on that figure, a spring contact 59 presses against the insulation discs 56 and 57, but does not engage the conductor disc 54, and when turned away from that position, the spring contact 59 engages the conductor disc 54. This mechanism comprises the main switch which is adapted to be optionally opened or closed by means of an arm 61 rigid with the shaft 51 beneath the base 16. It is intended that this arm 61 be mechanically connected to the brake pedal of the vehicle, so that when the pedal is depressed, the shaft 51 will be turned into that position indicated upon Fig. 6, wherein electrical connection is established between the spring contact 59 and the conductor disc 54, it being understood that this disc 54 is electrically connected to the shaft 51, which in turn is electrically connected to the shaft 29 and movable contact 42. The spring contact 59 is electrically connected as by a pin 62, to the leg 17, with the result that the spring contact 59 is constantly energized. Another spring contact 63 is mounted upon the base 16, and frictionally engages the conductor disc 54, upon the opposite side from that engaged by the contact 59. This contact 63 is electrically connected to one terminal of the electromagnet, as by a conductor 64, whereas the other terminal of the electromagnet, is connected by a conductor 65, to the leg or binding post 18. A conductor 66 electrically connects the coils 22 in series. A spiral spring 67 is connected at one end to the arm 61, and at the other end, by a screw 68, to the base 16, this spring 67 urging the shaft 51 in that direction which will break electrical connection between the spring contact or brush 59, and the conductor disc 54.

It is to be understood that the switch is to be interposed in the circuit of the current-consuming device, the supply of current to which it is desired to periodically fluctuate—for example, the switch may be interposed in the circuit of an automobile stop light. This may be conveniently accomplished by severing one of the leads to that stop light and connecting one of the severed ends to the leg or binding post 17, and the other severed end to the leg or binding post 18, with the result that the binding post proximal to the battery or other source of current, is continually energized. While it makes no difference which of the binding posts 17 or 18 is the one so energized, let it be assumed for the purpose of the description of the operation of the device, that it is the binding post 17. If such is the case, the brush contact 59 will also be continually energized, but the current can not pass therebeyond under normal conditions, because it is insulated from the conductor disc 54 by its engagement with the insulation discs 56 and 57. However, when the brake pedal is depressed as in applying the brakes of the vehicle, the arm 61 will be moved to rotate the shaft 51 and move the flat portion 58 of the conductor disc 54 away from the brush contact 59, whereupon the conductor disc 54 will receive current. Since this conductor disc 54 is in electrical communication with the switch arm 41 and its movable contact 42, this contact also will be energized. Furthermore, the brush contact 63 will also be energized because of its continual engagement with the conductor disc 54. This will permit current to pass through the conductor 64, through the coils 22, it being understood of course, that these coils are connected in series through the conductor 66, and thence to the binding post 18, which, of course, is connected to the stop light. The other side of the stop light is connected back to the source of current completing the circuit. However, the resistance of the coils 22, is relatively high, with the result that only a very small amperage is permitted to flow through the circuit, and the stop light is not illuminated. However, this current is sufficient to set up a magnetic field wherein magnetic lines of force travel from pole to pole of the electromagnet. The armature 36 being polarized inversely, the mutual attraction of unlike poles, causes the armature 36 to rotate with the shaft 29 to align itself with the direction of the magnetic flux, and this rotary movement of the shaft 29, also moves the switch arm 41, so that its contact 42 engages the fixed contact 47. However, from the above description of the wiring connections, it will be discerned that the contacts 42 and 47 are connected in parallel with the coils 22 of the electromagnet, so that in effect, when electrical connection is established between the contacts 42 and 47, the coils 22 are short-circuited. Hence, the resistance of the coils 22, being relatively high, the major portion of the current will pass directly from the binding post 17 to the binding post 18 through these contacts, whereupon the amperage in the entire circuit, will be so increased that the stop light will be illuminated. This, of course, will decrease the amperage within the coils 22, whereupon the strength of the electromagnet, will be so reduced that the spring 37 will rotate the shaft 29 and armature 36 in the opposite direction, effecting disconnection of the contact 42 from the contact 47. This will extinguish the stop light and again increase the amperage through the coils 22, setting up a strong magnetic field to act upon the armature 36, thus again moving the contact 42 to closing position, and again illuminating the stop light. It is readily apparent that this alternate illumination and extinguishment of the stop light, will be continued as long as the arm 61 is retained in switch-closing position, with the result that the stop light of the vehicle will be flashed on and off with a predetermined periodicity as long as the brake pedal is depressed. When the brake pedal is retracted from depressed position, the spring 67 will carry the arm 61 to switch-opening position, effecting de-energization of the circuit fluctuating switch.

Figs. 9 to 12 inclusive, disclose a slightly modified form of the invention. Here a pair of solenoids 76 and 77 are connected in series, as by a conductor 78, and are disposed in axial alignment. One terminal of the double solenoid thus established, is connected by a conductor 79, to one of the binding posts 81, whereas the other terminal of the double solenoid, is connected by a conductor 82, to the other binding post 83. A shaft 84 is journalled in the base 86 and a bracket 87 rigid therewith, the shaft 84 extending in perpendicularity with the axis of the solenoids, and midway therebetween. An armature 88 is carried by the shaft 84; and a coil spring 89 urges the shaft 84 and armature 88 into that position in which the armature 88 is perpendicular to the axis of the solenoids 76 and 77. However, when the solenoids are energized, the armature 88 being elongated as shown upon Fig. 10, and shaft 84, will be rotated through 90°, because of the polarity of the magnetic field set up as a result of such energization. A projection 91, carried upon one end of the armature 88, extends closely adjacent one of the poles of the electromagnet. The function of this projection 91, is to throw out of balance for both initial magnetic attraction of that pole for both ends of the armature, it being understood that the armature is composed of material having a low coefficient of residual magnetism, and thus will manifest no very pronounced polarity. Consequently, energization of the electromagnet, results in turning the armature so that that end of the armature carrying the projection 91, moves toward the associated pole of the electromagnet, or in a clockwise direction as viewed on Figure 10.

A disc 92 is mounted for rotary movement upon the shaft 84, and has a cut-out portion 93 in one side thereof. A pin 94 carried by the armature 88, is disposed within this cut-out portion 93. The cut-out portion 93 extends throughout slightly less than 90° of the periphery of the disc 92, with the result that the rotation of the armature and shaft, proceeds almost to completion in either direction before the pin 94 engages the shoulders of the disc 92 defining the cut-out portion 93. A pad 96 of felt or other cushioning material, is mounted upon each of these shoulders, to cushion the engagement of the pin 94 therewith. A strip 97 of conducting material, extends throughout a portion of the periphery of the disc 92, and is engaged at all times by a brush contact 98 which is carried by, and electrically connected to a plate 99, which in turn is electrically connected by a conductor 101, to the binding post 83. Another brush contact 102 is mounted upon the base 86, by means of a pin 103, and is electrically connected by a conductor 104, to the binding post 81. This brush contact 102 engages the conductor strip 97, when the disc 92 has been turned by the armature turning into alignment with the axis of the solenoids 76 and 77; but is disconnected from the conductor strip 97 when the disc 92 is turned to the extreme of its movement in the opposite direction. Fig. 12 shows the connection between the brush 102 and strip 97, broken.

The manner of operation of this modification, is substantially the same as that of the modification previously described. However, since this latter modification does not include a main switch, it is to be understood that such a switch is to be employed elsewhere in the circuit, and that current will be supplied to the interrupter or fluctuating switch when that main switch has been closed. Since the solenoids 76 and 77 are connected in series, and at all times connected to both binding posts 81 and 83, such closing of the main switch will result in energization of the solenoids, turning the armature 88 into alignment with the axes of the solenoids. This will cause the pin 94 to engage one of the shoulders defining the cutaway portion 93, and thus turn the disc 92 to bring the conductor strip 97 into engagement with the brush 102. Current will then pass from the binding post 81, through the conductor 104 and brush 102, through the strip 97, and through the brush 98, bar 99, and conductor 101, to the other binding post 83, with the result that the solenoids 76 and 77 will be shunted out, so that the major portion of the current will pass through the interrupter switch, with relatively little resistance, illuminating the stop light with full intensity. However, this will also result in the decrease in the number of magnetic lines of force produced by the solenoids, whereupon the spring 89 will rotate the shaft 84 and disc 92 in the opposite direction, causing the other shoulder defining the cut-away portion 93, to be engaged by the pin 94, with the result that electrical connection between the brush 102 and conductor 97, will be broken. This will cause the stop light to be extinguished, and an increase in the magnetic field of the solenoids, so that the armature is again swung to switch-closing position. It is obvious that this cycle of operation will be repeated as long as the main switch is kept closed. Preferably a relatively heavy disc 106 is made fast to the shaft 84, this disc serving as a flywheel, the inertia of which results in dampening, or slowing down the action of the switch, and making the periodicity thereof more regular.

Referring now to Figs. 7 and 8, a still further modified form is shown, wherein a single solenoid 111 is employed. One terminal of the solenoid is connected to one of the binding posts 112, by a conductor 113, and the other terminal of the solenoid is connected to the other binding post 114, by a conductor 115 and pin 116, with the result that the solenoid 111 is energized as long as current is supplied to the interrupter switch. Such energization of the solenoid 111, will result in drawing an armature 117 toward the core 118, this armature being in the form of a strip 119 of soft iron, carried by a strip of spring metal 121. The strip 121 is rigidly mounted upon the base 122, by means of a pin 123, and the natural resiliency of the material of which the strip 121 is made, urges the armature 117 away from the core 118. When the armature 117 is drawn toward the core 118, rotary movement is imparted to a shaft 126 which is journalled vertically between the base 122 and a bracket 127. This rotary movement is imparted by means of a rod 128 pivoted at one end to the armature 117, and at the other end, to a pin 129 carried eccentrically of the shaft 126, by means of a disc 131. A relatively heavy disc 132 rigid with the shaft 126, carries a pair of spaced pins 133 and 134 extending from the periphery thereof. A block 136 of insulation, is carried by the base 122, and supports a fixed contact 137 and a switch arm 138 which is pivotally mounted adjacent one end by means of a screw 139 or its equivalent, passing through the switch arm 138 into the block 136. The fixed contact 137 is connected by an electric conductor 141, to the binding post 114, through the pin 116, and the switch arm 138 is connected to the other binding post 112, by means of an electrical conductor 142 which is connected to a plate 143 through which the screw 139 is threaded inside the block 136 of insulation. The switch arm 138 is elongated so that its upper end 146 is disposed between the pins 133 and 134, and the parts are so proportioned and arranged that when the flywheel 132 rotates in one direction, the pin 133 will engage the extension 146 of the switch arm, swinging the switch arm to the left, as viewed upon Fig. 7, until electrical connection is established between this arm and the fixed contact 137. Similarly, when the flywheel 132 rotates in the opposite direction, the other pin 134 will engage the extension 146 of the switch arm 138, and swing the switch arm 138 in the other direction, breaking electrical connection between the switch arm and fixed contact. A rod 147 is carried by the switch arm 138, and is provided with a hook 148 at each end, adapted to engage the associated side of the block 136, to limit movement of the switch arm 138.

The operation of this switch is the same as that of the modifications previously described, in that when the solenoid 111 is energized, the armature 119 effects movement of the switch arm 138, to switch-closing position as will be readily understood, and when the solenoid is de-energized, the resiliency of the strip 121, will effect moving the switch arm 138 in the opposite direction, to break connection between the switch arm 138 and contact 137.

A still further modification is shown on Fig. 13, which discloses a much simpler form of switch than any of those previously described. This modification is encased in an elongated tubular housing 151 of suitable insulating material such as sheet fibre. The upper and lower ends of the housing 151, are closed by discs 152 and 153 respectively, of fibre. A strip 154 of conducting material such as brass, is secured to the housing by means of screws 156 and 157 passing therethrough into the discs 152 and 153 respectively. The upper ends 158 of the strips 154, are bent outward to provide flanges, and have holes 159 therethrough to permit the insertion of screws or their equivalent, to secure the switch in any desired location such as the under side of the floor board of an automobile. These flanges 158 not only serve in securing the switch in position, but also as the binding posts to which the leads of the circuit in which the switch is to be interposed, may be attached.

A solenoid 161 is secured to the upper disc 152, a convenient method of securing being by embedding within the under surface of the disc 152, the tube 162 upon which the turns 163 of the solenoid 161, are wound. A pair of spring contacts 166 and 167 are secured to the sides of the solenoid 163, and extend downward therefrom. The lower ends of these contacts, are deflected outward as at 168, to provide rounded surfaces against which a conductor head 169 may impinge to separate the contacts as the head 169 moves therebetween. This head 169 comprises a sleeve 171 and an annular flange 172 composed of conducting material, and a sleeve 173 of insulating material, disposed upon the sleeve 171. The sleeves and the tube 162 are in axial alignment, so that a continuation 176 of the armature 177 of the solenoid 161, passes through the head 169. The continuation 176 of the armature 177, is slidable within the head 169, so that as the armature 177 moves upward, the head 169 is stationary until engaged by an enlargement 178 upon the end of the continuation 176, whereupon the head 169 will be moved upward, bringing the flange 172 into engagement with both contacts 166 and 167. Also, when the armature 177 moves downward, the flange 172 will remain in engagement with the contacts until the head 169 is engaged by a shoulder 179, whereupon the head will be forced downward, moving the flange 172 out of engagement with the contacts.

The contacts 166 and 167 are extended upward upon their respective sides of the solenoid 161, so that the screws 156 may be threaded therethrough to establish electrical connection between the strips 154 and the contacts. Furthermore, each of the terminals 181 and 182 of the solenoid 161, is also in electrical engagement with one of the screws 156, so that the solenoid is electrically connected in parallel with the contacts 166 and 167.

The manner of operation of this last described modification, is substantially as follows:

When no current is passing through the switch, the armature 177 and head 169 will occupy the positions indicated upon Fig. 13, wherein the contacts 166 and 167 are not electrically connected. Hence, when current is supplied to the switch, the full amperage thereof must pass through the solenoid 161, with the result that the armature 177 will be drawn upward. This will cause the enlargement 178 to strike the under side of the head 169 as the armature 177 approaches the completion of its stroke, causing the flange 172 to electrically connect the contacts 166 and 167. This will permit an increased flow of current so that the stop light or other current-consuming device will be activated, but the amperage through the solenoid 161 will be so reduced that the armature 177 will drop of its own weight, whereupon the shoulder 179 will strike the top of the head 169, pressing it downwards to break connection between the contacts 166 and 167. Thus the stop light will be de-energized, and the energization of the solenoid 161 will be increased, drawing the armature 177 upward again, and so on. This cycle of operation will be continued as long as current is supplied to the interrupter switch.

It should be pointed out that the four modifications of the invention, hereinabove described, are similar, in that they operate on precisely the same principle. In the case of each of the modifications, the circuit-controlling contacts are shunted around the solenoid, or electromagnet, as the case may be, with the result that when the contacts are electrically connected, the amperage flowing through the electromagnetic device, is reduced, resulting in activation of the stop light; and also resulting in setting in motion, mechanical means for breaking connection between the contacts. Also, when these contacts have been so separated, the current passing through the solenoid, will be increased, resulting in setting in motion, mechanism to again establish electrical connection.

It is to be understood that the details of the invention as herein disclosed, are subject to alteration within the spirit or scope of the appended claims.

We claim:

1. In a switch, a base, a shaft mounted for rotary reciprocation thereon, a contact mounted in said base, a contact arm mounted for movement about the axis of said shaft and pressing against said base in sliding engagement therewith, means carried by said shaft and adapted to engage said arm to move the arm into engagement with said fixed contact as the shaft approaches one extreme of its movement and to move the arm out of engagement with said contact as the shaft approaches the other extreme of its movement, and means for reciprocating said shaft.

2. In a switch, a base, a shaft mounted for rotary reciprocation thereon, a contact mounted in said base, a contact arm mounted for movement about the axis of said shaft and pressing against said base in sliding engagement therewith, means carried by said shaft and adapted to engage said arm to move the arm into engagement with said fixed contact as the shaft approaches one extreme of its movement and to move the arm out of engagement with said contact as the shaft approaches the other extreme of its movement, means for reciprocating said shaft, said reciprocating means including an electromagnet and an armature associated therewith and mounted upon said shaft, means for energizing said electromagnet when said arm is in one of said positions and for de-energizing said electromagnet when the arm is in the other of said positions, and a spring resisting movement of said shaft by said electromagnet.

3. In a switch, a base, an electromagnet mounted thereon, a shaft journalled for rotary reciprocation on said base, an armature associated with said electromagnet and carried by said shaft, spring means urging said armature from said electromagnet, a fixed contact mounted in said base, a resilient contact arm mounted for movement about the axis of said shaft and pressing against said base in sliding engagement therewith, and means carried by said shaft and adapted to engage said arm to move the arm into and out of engagement with said fixed contact.

4. In a switch, a base, an electromagnet mounted thereon, a shaft journalled for rotary reciprocation on said base, an armature associated with said electromagnet and carried by said shaft, spring means urging said armature from said electromagnet, a fixed contact mounted in said base, a resilient contact arm mounted for movement about the axis of said shaft and pressing against said base in sliding engagement therewith, a pair of spaced pins carried by said shaft, and means rigid with said contact arm and extending between said pins to be engaged by one pin as the shaft approaches one extreme of its movement and by the other pin as the shaft approaches the other extreme of its movement.

5. In a switch, a base, an electromagnet mounted thereon, a shaft journalled for rotary reciprocation on said base, an armature associated with said electromagnet and carried by said shaft, spring means urging said armature from said electromagnet, a fixed contact mounted in said base, a resilient contact arm mounted for movement about the axis of said shaft and pressing against said base in sliding engagement therewith, a pair of spaced pins carried by said shaft, means rigid with said contact arm and extending between said pins to be engaged by one pin as the shaft approaches one extreme of its movement, and by the other pin as the shaft approaches the other extreme of its movement, said electromagnet and said contacts being connected in parallel with each other whereby said electromagnet is substantially deenergized when said contacts engage each other.

STANISLAS DYKTOR.
HERBERT G. DYKTOR.